(No Model.)
2 Sheets—Sheet 1.
J. STEVENS.
CAN FILLING MACHINE.
No. 291,799. Patented Jan. 8, 1884.
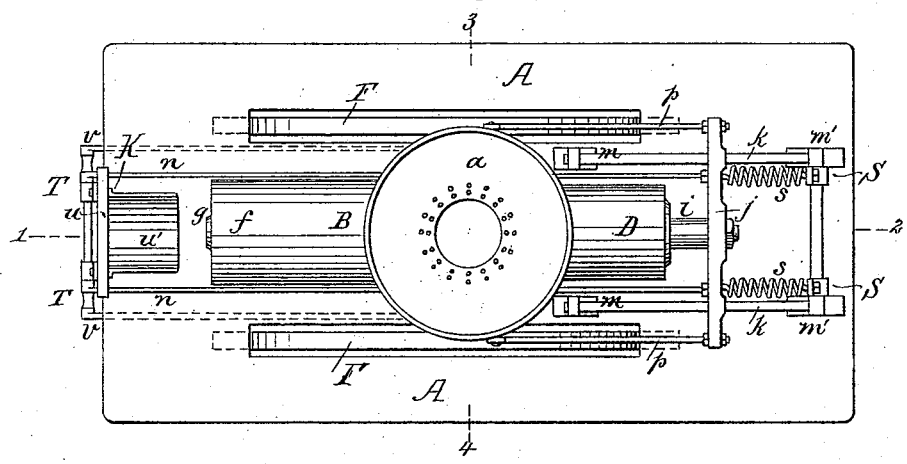
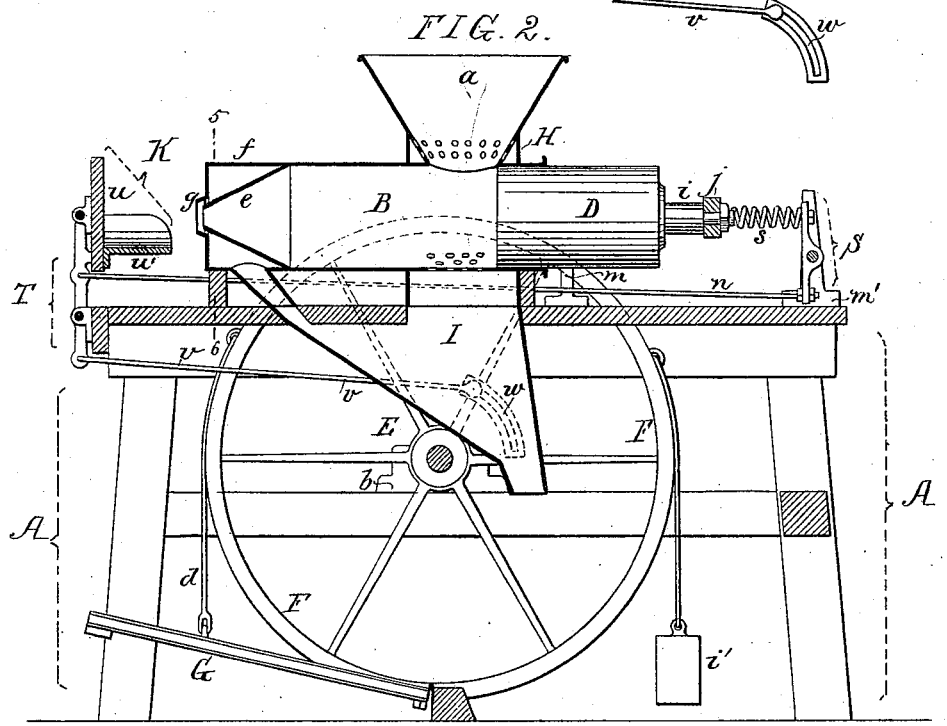
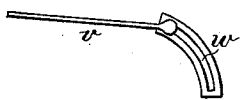
Witnesses:
James T. Tobin
John E. Parker
Inventor
John Stevens
by his Attorneys
Howson & Son (No Model.)   2 Sheets—Sheet 2.

J. STEVENS.
CAN FILLING MACHINE.

No. 291,799. Patented Jan. 8, 1884.

UNITED STATES PATENT OFFICE.

JOHN STEVENS, OF WOODSTOWN, NEW JERSEY.

CAN-FILLING MACHINE.

SPECIFICATION forming part of Letters Patent No. 291,799, dated January 8, 1884.

Application filed October 18, 1883. (No model.)

*To all whom it may concern:*

Be it known that I, JOHN STEVENS, a citizen of the United States, and a resident of Woodstown, Salem county, New Jersey, have invented certain Improvements in Can-Filling Machines, of which the following is a specification.

My invention consists of a simple and effective machine for filling cans with tomatoes and other vegetables, the detailed construction and the operation of the machine being too fully described hereinafter to need preliminary explanation.

Figure 4:
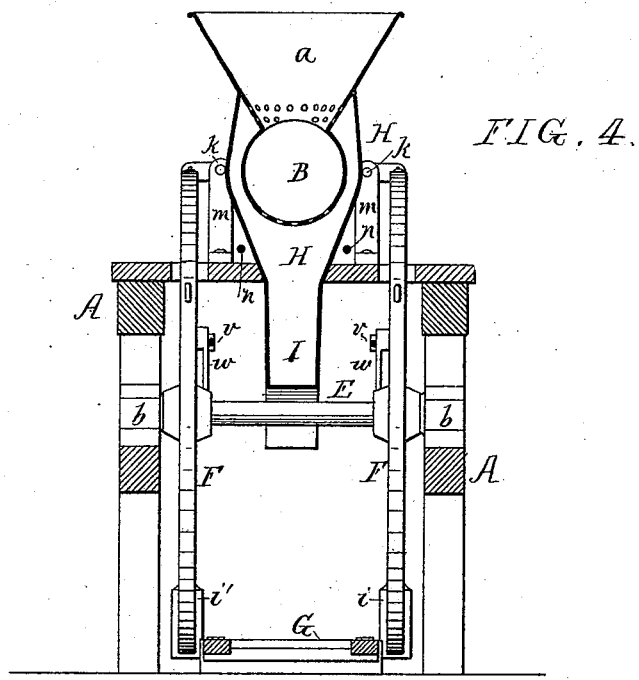
Figure 5:
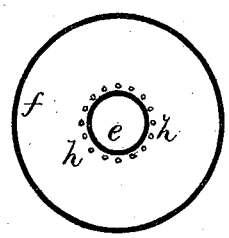

In the accompanying drawings, Figure 1, Sheet 1, is a plan view of my improved can-filling machine; Fig. 2, a vertical section on the line 1 2, Fig. 1; Fig. 3, a detached view of part of Fig. 1. Fig. 4, Sheet 2, is a transverse section on the line 3 4, Fig. 1; Fig. 5, a transverse section on the line 5 6, Fig. 2; and Fig. 6, a diagram illustrating the filling of the can.

To a suitable frame, A, is attached a cylinder, B, with which communicates a hopper, $a$, for receiving the tomatoes.

On a shaft, E, journaled to suitable bearings, $b$, secured to the frame A, are two pulleys, F F, to which a vibrating motion may be imparted in one direction by the treadle G, and in the contrary direction by weights $i'$, two straps, $d\,d$, being connected to the treadle, one strap being attached to the periphery of one wheel and the other to that of the other wheel.

The cylinder B has a tapering nozzle, $e$, which is surrounded by a casing, $f$, forming an extension of the cylinder B, and this casing has an annular tapering projection, $g$, surrounding the end of the nozzle $e$. Between the projection $g$ and the spout are a series of perforations, $h$, which allow the air and juice to escape from the can while the latter is being filled, these perforations being more clearly shown in Fig. 5. The cylinder B and hopper $a$ are perforated, to allow the juices to drain from the tomatoes which are contained in the hopper and cylinder, a casing, $h$, surrounding the cylinder and part of the hopper, and receiving the juices, which are directed by a spout, I, into any suitable receptacle. The chamber formed by the casing $f$ also communicates with this draining-spout I.

A plunger, D, is adapted to the cylinder B, and to the stem $i$ of this plunger is secured a cross-head, J, which is guided by the rods $k\,k$, attached to standards $m\,m'$ on the frame A, each end of the cross-head being connected by a cord or band, $p$, to one of the wheels F. Two coiled springs, $s\,s$, are attached at one end to the cross-head J, and at their other ends to the upper arms of two levers, S S, on a rock-shaft having its bearings in the standards $m'$, the lower arms of the levers being connected by rods $n$ to the long arms of levers T T on a rock-shaft adapted to bearings on the front end of the frame.

To the long arms of the levers T T is pivoted the can-holder K, which consists of a back plate, $u$, and a concave plate, $u'$, conforming with the shape of the can.

To the short arm of each lever T is attached a rod, $v$, a pin on the end of which passes through a slot in a segmental plate, $w$, secured to or forming part of each wheel F.

Figure 6:
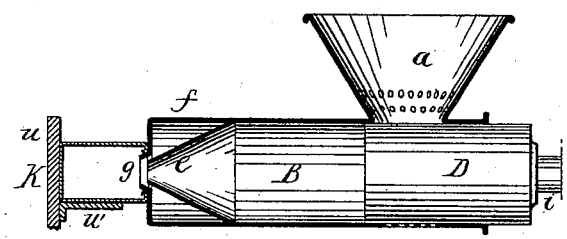

The operation of the machine is as follows: The plunger and can-holder being in the position shown in Fig. 2, the tomatoes are introduced into the hopper and cylinder B, and the operator, having placed a can in the holder K, depresses the treadle G, thus causing the thrusting of the plunger into the cylinder B, owing to the connection of said plunger to the wheels F F. At the same time the head of the can is thrust against the casing $f$, as shown in Fig. 6, because of the connections $s$, S, and $n$, between the plunger cross-head and the levers T, carrying the can-holder, the springs $s$ yielding to permit the continued movement of the plunger after the contact of the can with the casing $f$. As the movement of the plunger is continued, part of the contents of the cylinder B are forced through the nozzle $e$ into the can, the air in the latter, as well as the surplus juice, escaping through the perforations $h$ around the nozzle. If desired, the casing $f$ may be provided with a packing-ring, to insure a tight joint between the same and the can. When the can has been filled, the attendant removes his foot from the treadle, and the weights $i\,i$ restore the wheels to their original position. On the reverse movement of the wheels F the springs $s\,s$ serve to retract the plunger D; but the can is held against the casing $f$ by the tension of the springs until the slotted segments *w* on the wheels F act upon the rods *v*, thus through the medium of the levers T effecting the withdrawal of the can-holder.

I claim as my invention—

1. The combination of the cylinder B and its hopper *a* and plunger D with the movable can-holder K, and with mechanism, substantially as described, for moving the said plunger and can-holder longitudinally to and from each other as set forth.

2. The combination of the cylinder, provided with a hopper, and having perforations below the hopper, with the plunger D and mechanism for operating the same, as set forth.

3. The combination of the cylinder B, plunger D, can-holder K, levers S and T, rods *n* and *p*, and springs *s*, as set forth.

4. The combination of the cylinder B, plunger D, wheels F, can-holder K, levers S and T, rods *n*, *p*, and *v*, springs *s*, and slotted segments *w*, as set forth.

5. The combination of the cylinder B with nozzle *e*, the casing *f*, and the perforations *h*, as set forth.

In testimony whereof I have signed my name to this specification in the presence of two subscribing witnesses.

JOHN STEVENS.

Witnesses:
  JOHN E. PARKER,
  HUBERT HOWSON.